(12) United States Patent
Mukherjee et al.

(10) Patent No.: US 9,391,917 B2
(45) Date of Patent: Jul. 12, 2016

(54) METHODS AND SYSTEMS FOR RECOMMENDING COMPUTATIONAL RESOURCES

(71) Applicant: Xerox Corporation, Norwalk, CT (US)

(72) Inventors: Tridib Mukherjee, Bangalore (IN); Gueyoung Jung, Rochester, NY (US); Shruti Kunde, Mumbai (IN)

(73) Assignee: Xerox Corporation, Norwalk, CT (US)

( * ) Notice: Subject to any disclaimer, the term of this patent is extended or adjusted under 35 U.S.C. 154(b) by 320 days.

(21) Appl. No.: 14/244,918

(22) Filed: Apr. 4, 2014

(65) Prior Publication Data

US 2015/0286935 A1 Oct. 8, 2015

(51) Int. Cl.
| | | |
|---|---|---|
| G06F 17/00 | (2006.01) |
| G06N 5/02 | (2006.01) |
| H04L 12/911 | (2013.01) |
| G06F 9/455 | (2006.01) |
| G06F 9/50 | (2006.01) |

(52) U.S. Cl.
CPC ............ *H04L 47/70* (2013.01); *G06F 9/45558* (2013.01); *G06F 9/505* (2013.01); *G06F 9/5077* (2013.01); *G06F 2009/4557* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,463,633 | B2* | 6/2013 | Jung | G06Q 10/06 705/7.11 |
| 8,489,939 | B2* | 7/2013 | Hiltunen | G06F 11/008 714/48 |
| 8,654,385 | B2* | 2/2014 | Jung | G06F 3/1212 358/1.15 |
| 8,667,141 | B2* | 3/2014 | Jung | G06F 9/5083 709/223 |
| 8,839,049 | B2* | 9/2014 | Hiltunen | G06F 11/008 714/48 |
| 8,849,695 | B2* | 9/2014 | Lee | G06Q 30/02 702/182 |
| 8,849,976 | B2* | 9/2014 | Thibeault | G06F 9/5027 709/223 |
| 8,850,449 | B2* | 9/2014 | Hiltunen | G06F 9/50 718/108 |
| 8,965,830 | B2* | 2/2015 | Jung | G06F 17/30539 706/48 |
| 9,124,498 | B2* | 9/2015 | Jung | H04L 43/0876 |
| 9,262,502 | B2* | 2/2016 | Kunde | G06F 17/30589 |
| 9,269,259 | B2* | 2/2016 | Mondal | H04L 67/04 |
| 9,305,104 | B2* | 4/2016 | Wu | G06F 17/30867 |
| 9,342,129 | B2* | 5/2016 | Mukherjee | G06F 1/3203 |

OTHER PUBLICATIONS

A Data and Task Co-scheduling Algorithm for Scientific Cloud Workflows Kefeng Deng; Kaijun Ren; Ming Zhu; Junqiang Song IEEE Transactions on Cloud Computing Year: 2015, vol. PP, Issue: 99 pp. 1-1, DOI: 10.1109/TCC.2015.2511745 IEEE Early Access Articles.*

Towards Beneficial Transformation of Enterprise Workloads To Hybrid Clouds Jinho Hwang IEEE Transactions on Network and Service Management Year: 2016, vol. PP, Issue: 99 pp. 1-1, DOI: 10.1109/TNSM.2016.2541120 IEEE Early Access Articles.*

(Continued)

*Primary Examiner* — Michael B Holmes

(57) ABSTRACT

Methods and systems for recommending one or more computational resources. A portion of computational resources is determined from a set of computational resources associated with a datacenter based on a user-profile associated with a user, from one or more users, and the set of computational resources. The user-profile comprises at least one of a required performance level, a required load, or a cost constraint. The one or more computational resources are recommended from the portion of computational resources, in response to requests received from the one or more users.

19 Claims, 4 Drawing Sheets

(56) References Cited

OTHER PUBLICATIONS

Implementing a low-cost, personalized and location based service for delivering advertisements to mobile users Dimitris Liapis; Spyridon Vassilaras; Gregory S. Yovanof Wireless Pervasive Computing, 2008. ISWPC 2008. 3rd International Symposium on Year: 2008 pp. 133-137, DOI: 10.1109/ISWPC.2008.4556182 IEEE Conference Publications.*

Efficient computation of fair communication equilibria in generalized coordination games M. Maskery; V. Krishnamurthy Proceedings of the 2005, American Control Conference, 2005. Year: 2005 pp. 3492-3493 vol. 5, DOI: 10.1109/ACC.2005.1470513 IEEE Conference Publications.*

\* cited by examiner

METHODS AND SYSTEMS FOR RECOMMENDING COMPUTATIONAL RESOURCES

TECHNICAL FIELD

The presently disclosed embodiments are related, in general, to a computing infrastructure. More particularly, the presently disclosed embodiments are related to methods and systems for recommending computational resources in the computing infrastructure.

BACKGROUND

Computing infrastructure may refer to a network of computing devices, interconnected over a communication network. For example, computing infrastructure may correspond to a cloud network including a datacenter. Further, the datacenter may include one or more physical servers, from which the computational resources (e.g., in the form of virtual machines (VMs)) can be allocated to the users. The users may utilize the allocated computational resources for executing one or more applications/workload. Examples of the computational resources may include, but are not limited to, CPU, random access memory (RAM), storage space, software, and so forth.

Generally, one or more computational resources are recommended to the users either from complete infrastructure or from a fixed percentage of the complete infrastructure. However, there may exist different capacities of different servers in the computing infrastructure. In addition, requirements from different users may also vary significantly. For example, using a fixed percentage of complete infrastructure for recommendation of computational resources may lead to over-provisioning (i.e., more than that is actually required by the user) for a small enterprise, whereas same fixed percentage may lead to under-provisioning (i.e., not sufficient to meet the user's requirement) for a big enterprise.

SUMMARY

According to embodiments illustrated herein, there is provided a method for recommending one or more computational resources to one or more users. The method includes determining a portion of computational resources from a set of computational resources, associated with a datacenter, based on a user-profile associated with each user from the one or more users, and the set of computational resources. The user-profile includes at least one of a required performance level, a required load, or a cost constraint. The method further includes recommending the one or more computational resources from the portion of computational resources, in response to requests received from the one or more users. The method is performed by one or more processors.

According to embodiments illustrated herein, there is provided a system for recommending one or more computational resources to one or more users. The system includes one or more processors operable to determine a portion of computational resources from a set of computational resources associated with a datacenter based on a user-profile associated with each user from the one or more users, and the set of computational resources. The user-profile includes at least one of a required performance level, a required load, or a cost constraint. The one or more processors are further operable to recommend the one or more computational resources from the portion of computational resources, in response to requests received from the one or more users.

According to embodiments illustrated herein, there is provided a computer program product for use with a computer. The computer program product includes a non-transitory computer readable medium. The non-transitory computer readable medium stores a computer program code for recommending one or more computational resources to one or more users. The computer program code is executable by one or more processors to determine a portion of computational resources from a set of computational resources associated with a datacenter based on a user-profile associated with each user from the one or more users, and the set of computational resources. The user-profile includes at least one of a required performance level, a required load, or a cost constraint. The computer program code is further executable by the one or more processors to recommend the one or more computational resources from the portion of computational resources, in response to requests received from the one or more users.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
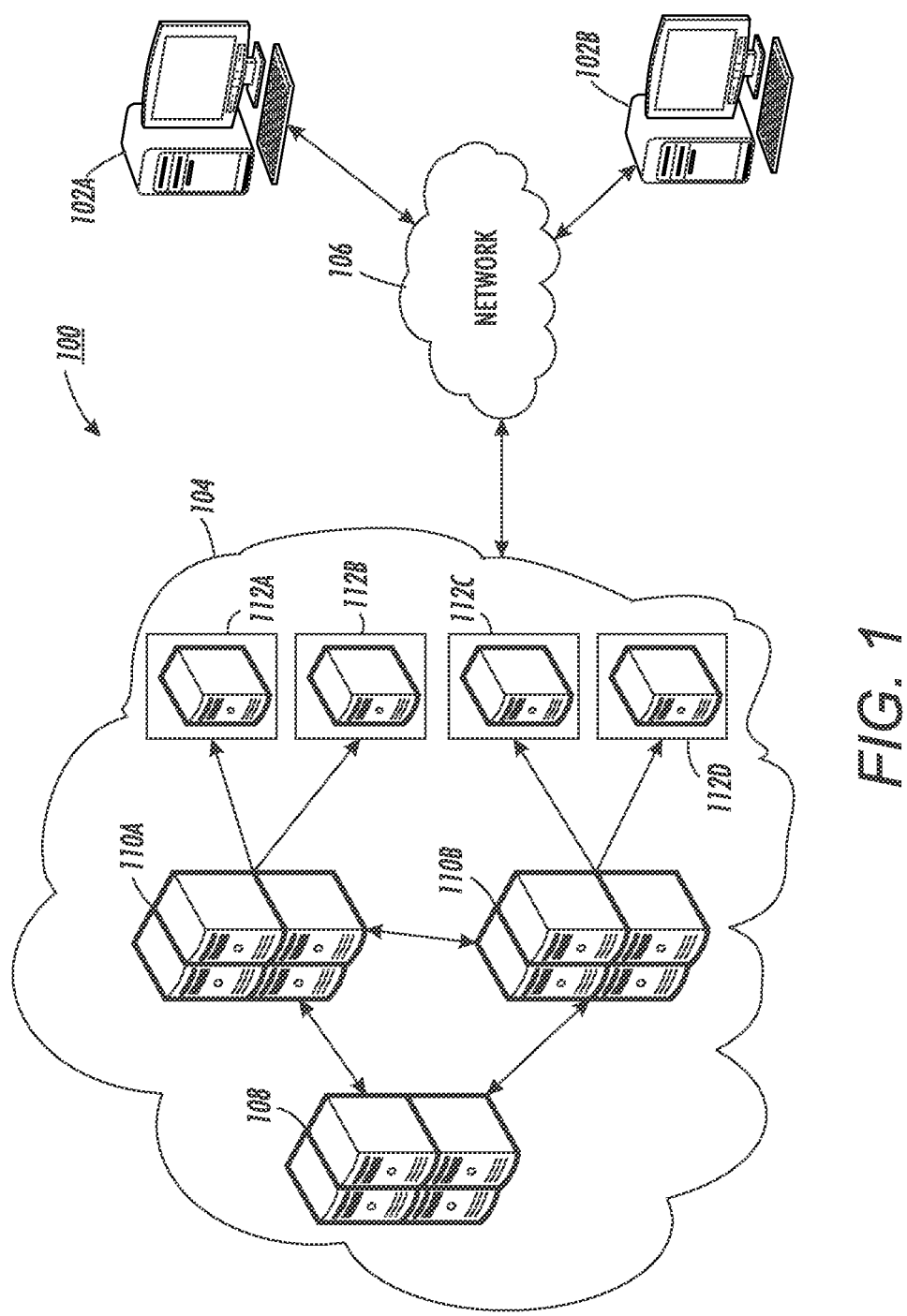
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "computing infrastructure" refers to a collection of one or more computing devices such as, but not limited to, computers, desktops, laptops, servers, and so forth connected with each other over a network. One or more computational resources may be recommended to users from the computing infrastructure for executing one or more applications/workloads.

A "cloud-computing infrastructure" refers to a universal collection of computational resources (such as computing instances, storage, information hardware, various platforms, and services) over a communication medium (such as internet) and forms individual units within the virtualization environment. In an embodiment, one or more computing devices, registered with the cloud-computing infrastructure, utilize the resources to perform respective operations. Further, in an embodiment, the cloud-computing infrastructure may be a part of the computing infrastructure and may include a datacenter for allocating the computational resources to the users. In an embodiment, cloud-computing infrastructure may provide one or more services such as, but not limited to, Infrastructure as a service (IaaS), Platform as a service (Paas), Software as a service (SaaS), Storage as a service (STaaS), Security as a service (SECaaS), and Data as a service (DaaS). In an embodiment, the cloud-computing infrastructure is an example of the computing infrastructure.

"Computational resources" correspond to resources utilized for executing a project/application. In an embodiment, the computational resources correspond to, but are not limited to, processor instances, storage space, and RAM space. In an embodiment, the computational resources may further correspond to, but are not limited to, software applications, security services, and database services that can be utilized by the computing devices.

A "virtual machine (VM)" refers to a software that emulates a physical computing environment on a computing device upon which an operating system (OS) or a program can be installed and executed. The virtual machines are installed upon a virtualization layer such as a virtualization platform or a hypervisor that manages the virtual machine and handles the communication between the virtual machine and the underlying physical hardware of the computing device. In an embodiment, multiple virtual machines may be implemented on the virtualization layer. A cloud-computing infrastructure provider may recommend the computational resources to customers in the form of the virtual machines (VMs). For example, 1 GB RAM, 2 CPUs, and a disk space of 20 GB may constitute one virtual machine.

A "set of computational resources" refers to all the computational resources associated with the computing infrastructure. Thus, the set of computational resources correspond to total capacity of the computational resources associated with computing infrastructure.

A "portion of computational resources" refers to a subset of the set of computational resources. The portion may correspond to a percentage value, fraction value, or any other numerical value that can be determined based on a user-profile associated a user and the set of computational resources.

A "user-profile" refers to a profile associated the user that includes information pertaining to user's requirements. For example, the user-profile may include at least one of a performance requirement, a load requirement, or a cost constraint, corresponding to the user's requirements. In an embodiment, the user-profile may be generated based on at least one of an input provided by the user during sign-up/registration with the computing infrastructure or a historical data.

A "parameter" refers to one of the requirements corresponding to a user. In an embodiment, the parameter corresponds to at least one of a performance requirement, load requirement, or cost constraint that are included in the user-profile. Further, in an embodiment, the parameters may be independent of each other, which means that varying one parameter does not affect the value of other parameter. In an alternate embodiment, the parameters may be dependent on each other. In that case, varying the value of one parameter (e.g., the performance values) changes the values of other parameters (e.g., the load values).

A "historical data" refers to a data, collected at the computing infrastructure, as one or more requests are received from the user. Based on the one or more requests, various requirements of the users (e.g., the performance requirement, load requirement, cost constraint, etc.) may be extracted to generate the historical data. In an embodiment, the historical data may be determined based on the execution of the applications/workload transmitted by the user.

FIG. 1 is a block diagram illustrating a system environment 100 in which various embodiments can be implemented. The system environment 100 includes one or more user-computing devices 102a and 102b (hereinafter, collectively referred to as user-computing devices 102), a datacenter 104, and a network 106. The datacenter 104 includes a control server 108, one or more virtual machine servers 110a and 110b (hereinafter, collectively, referred to as virtual machine servers 110) and one or more virtual machines 112a-d (hereinafter, collectively referred to as the virtual machines 112). In an embodiment, a set of computational resources may be associated with the datacenter 104, such that the set of computational resources correspond to computational resource capacity available with the datacenter 104. It will be understood by a person skilled in the art that the datacenter 104 may be a part of the computing infrastructure (not shown in FIG. 1) associated with a provider. In an embodiment, the various devices of the system environment 100 (i.e., the user-computing devices 102, the control server 108, and the virtual machine servers 110) may be interconnected over the network 106.

The user-computing devices 102 refer to computing devices used by the users, who want to rent/purchase the one or more computational resources (e.g., in the form of virtual machines 112) from the datacenter 104. Using the user-computing devices 102, the users may transmit applications/workloads to the datacenter 104 for processing. Further, the users may provide inputs to the datacenter 104 while signing-up/registering with the datacenter 104 using the user-computing devices 102. For example, the users may provide various details such as, but not limited to typical load requirement, typical performance expectations, typical budget (i.e., cost) allocated for the VMs, and so forth. In an embodiment, the user-computing devices 102 may access the one or more computational resources or the virtual machines 112 over ssh or remote desktop. The user-computing devices 102 may include a variety of computing devices, such as a desktop, a laptop, a personal digital assistant (PDA), a tablet computer, and the like.

The network 106 corresponds to a medium through which content and messages/signals flow between various devices of the system environment 100 (i.e., the user-computing devices 102, the control server 108, and the virtual machine servers 110). Examples of the network 106 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 106 in accordance with various wired and wireless communication protocols such as Transmission Control Protocol and Internet Protocol (TCP/IP), User Datagram Protocol (UDP), and 2G, 3G, or 4G communication protocols.

The control server 108 refers to a computing device that determines a portion of computational resources from the set of computational resources (e.g., based on a determined percentage value). In an embodiment, the control server 108 transmits a client application to the user-computing devices 102 and may receive the application/workload through the client application (e.g., using a web-interface). Further, the control server 108 may receive the input corresponding to the user's requirement, provided by the user during signup/registration. Subsequently, the control server 108 may generate a user-profile based on the user's input. In alternate embodiment, the control server 108 may generate the user profile based on the historical data. The historical data may include information pertaining to the workloads/applications previously transmitted by the user, for execution. In an embodiment, the control server 108 determines the portion of the computational resources based on the user-profile and the set of computational resources. Further details about the determination of the portion of computational resources have been discussed in conjunction with FIG. 3. The control server 108 may be realized through various types of servers such as, but not limited to, Java server, .NET framework, and Base4 server.

The virtual machine servers 110 refer to one or more physical servers that have a pool of computational resources. In an embodiment, the virtual machine servers 110 may rent out one or more computational resources from the pool of computational resources to the users by hosting the virtual machines 112. In an embodiment, the virtual machine servers 110 may be instructed by the control server 108 for the allocation of the computational resources. In an embodiment, the virtual machine servers 110 include hypervisor that may map the computational resources associated with the virtual machines 112 to the hardware resources of the virtual machine servers 110. In an embodiment, the virtual machines 112 may connect to the network 106 through the virtual machine servers 110 using at least one of a Network Address Translation (NAT) protocol, or bridging protocol. Examples of the hypervisor may include, but are not limited to, VMware®, KVM®, Xen®, etc.

The virtual machines 112 refer to a set of virtual machines that are hosted on the virtual machine servers 110. In an embodiment, the virtual machines 112 correspond to the computational resources recommended to the users for processing the workload. In an embodiment, the recommendation of the virtual machines 112 may be made from the portion of the computational resources.

It will be apparent to a person having ordinary skill in the art that the functionalities of the control server 108 may be integrated with the virtual machine servers 110, without departing from the scope of the disclosure.

Figure 2:
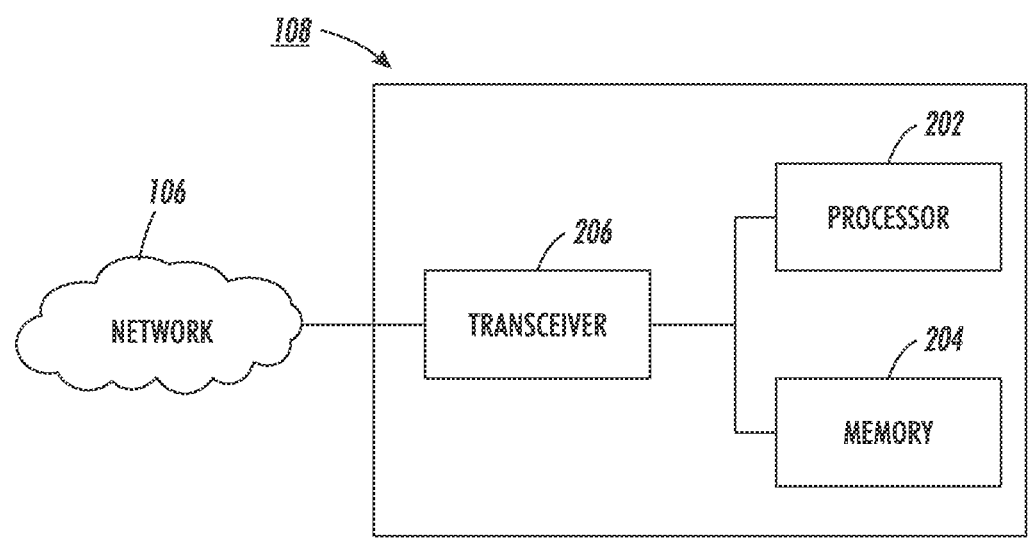
FIG. 2 is a block diagram illustrating a control server for recommending the one or more computational resources to the users in accordance with at least one embodiment.

FIG. 2 is a block diagram illustrating the control server 108, in accordance with at least one embodiment. The control server 108 includes a processor 202, a memory 204, and a transceiver 206. In an embodiment, the control server 108 corresponds to a system for recommending the one or more computational resources to the users.

The processor 202 is coupled to the memory 204 and the transceiver 206. The processor 202 includes suitable logic, circuitry, and/or interfaces that are operable to execute one or more instructions stored in the memory 204 to perform predetermined operation. The memory 204 may be operable to store the one or more instructions. The processor 202 may be implemented using one or more processor technologies known in the art. Examples of the processor 202 include, but are not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person having ordinary skills in the art that the one or more instructions stored in the memory 204 enables the hardware of the control server 108 to perform the predetermined operation.

The transceiver 206 transmits and receives messages and data to/from various components of the system environment 100 (i.e., the user-computing devices 102, the virtual machine servers 110, etc.). Examples of the transceiver 206 may include, but are not limited to, an antenna, an Ethernet port, a USB port or any other port that can be configured to receive and transmit data. The transceiver 206 transmits and receives data/messages in accordance with the various communication protocols, such as, TCP/IP, UDP, and 2G, 3G, or 4G communication protocols. Operation of the control server 108 has been described in conjunction with FIG. 3.

Figure 3:
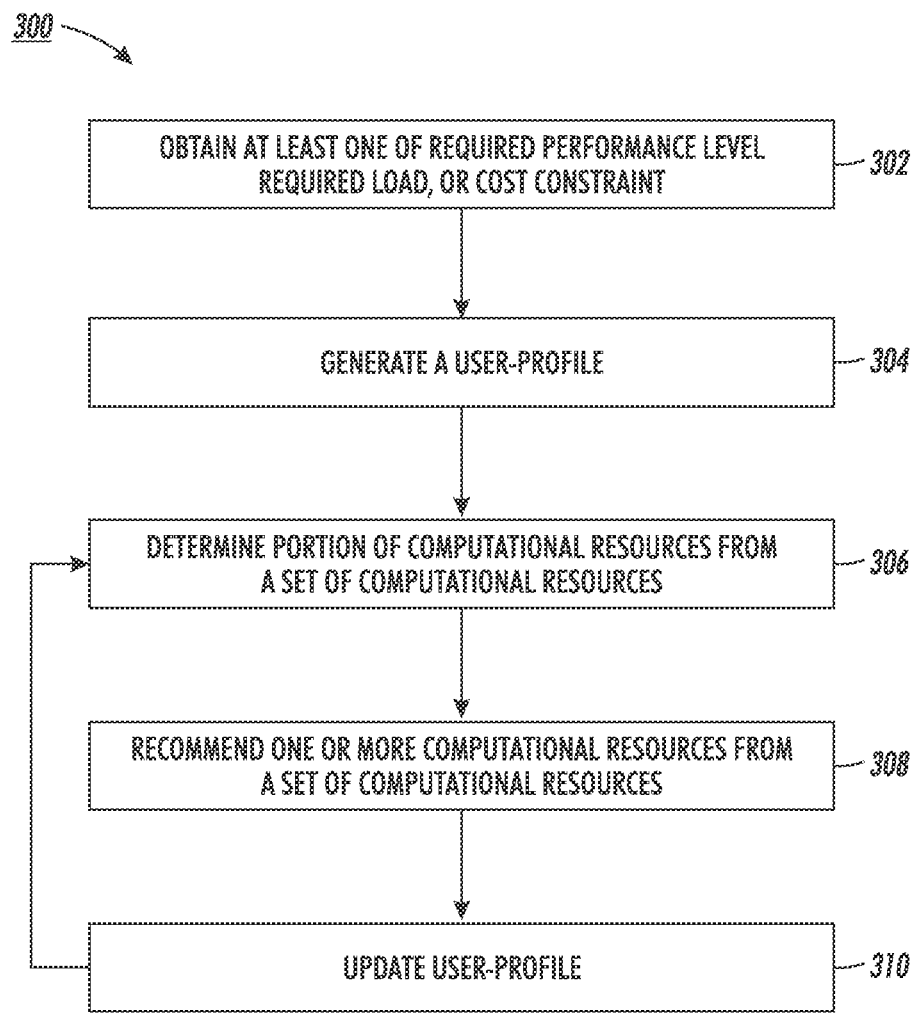
FIG. 3 is a flowchart illustrating a method for recommending the one or more computational resources to the users, in accordance with at least one embodiment.

FIG. 3 is a flowchart 300 illustrating a method for recommending the one or more computational resources to the users, in accordance with at least one embodiment. In an embodiment, the method for recommending the one or more computational resources is implemented on the control server 108. The flowchart 300 is described in conjunction with FIG. 1 and FIG. 2.

At step 302, at least one of the required performance level, the required load level, or the cost constraint is received from the user. In an embodiment, the processor 202 receives various types of the requirements. As disclosed above, the user may provide the requirements pertaining to the performance, load, cost etc. using the user-computing devices 102. In an embodiment, when the user attempts to register/sign-up on the datacenter 104, the client application may present a user-interface (UI) on the user-computing device 102a. The UI may include one or more mandatory fields to be inputted by the user. For example, in an embodiment, when the user registers for recommending the computational resources for hosting the website, there may be fields such as, "typical simultaneous users to be support", "required page access per minute", and the like. It will be understood by a person skilled in the art that the type of the information required from the user may vary in accordance with the type of the recommendation that the user wants. For example, type of the inputs required from the user will be different if the user is requesting for recommendation of the computational resources for hosting web-service applications than the type of the inputs if the user is requesting for the recommendation of the computational resources for executing big-data applications.

In another embodiment, the user's requirement corresponding to the performance, load, cost, etc., may be obtained from the applications/workloads previously transmitted by the user for execution. The processor 202 may observe a pattern of the requests transmitted by the user and may derive a historical data based on the pattern. Based on the historical data, the processor 202 may determine typical user requirements. For example, the processor 202 may consider the maximum performance requirement of one or more applications, transmitted by the user, in a pre-defined time interval as user's typical performance requirement. In a similar way, maximum cost incurred by the user for the execution of the workload may be considered as typical cost requirement.

In an embodiment, in order to maintain the historical data, the processor 202 monitors the performance of the one or more applications sent by the user for execution. In an embodiment, the processor 202 may monitor the processor usage, memory usage and storage space usage of the one or more applications. Further, the processor 202 maintains a log of these usage parameters. Based on the log, the processor 202 may determine an average performance required by the applications sent by the user. Further, it will be understood by a person having ordinary skill in the art that the processor 202 may update the historical data based on the execution of applications/workloads transmitted by the user.

At step 304, a user-profile is generated. The processor 202 may generate the user-profile based on the obtained user's requirement (i.e., the performance requirement, load requirement, cost constraint, etc.), as disclosed in the step 302. In an embodiment, corresponding to each of the registered users, the processor 202 may store the user-profiles in the memory 204. Table 1 provided below illustrates a typical user-profile (based on the user's requirement received during signup/registration) associated with a user, who wants recommendation for computational resources for hosting web-sites on the datacenter 104:

TABLE 1

Illustration of user's requirement

| User | Typical Performance requirement (page access per minute) | Typical Load requirement (simultaneous requests) | Typical cost constraint ($/day) |
|---|---|---|---|
| User-1 | 25000 | 1000 | 15 |
| User-2 | 12500 | 10000 | 20 |
| User-2 | 20000 | 3000 | 25 |

As discussed, in an embodiment, the processor 202 may monitor the execution of the applications/workloads transmitted by the users. For example, the processor 202 may observe that the typical performance requirement for the user-1 is 30000 page access per minutes (instead of 25000 page access per minute, as illustrated in the Table 1). In such a scenario, the processor 202 may update the user's requirement accordingly. It will be understood by a person having ordinary skill in the art that, in a similar way, other requirements may also be monitored by the processor 202 and may be updated based on the monitoring.

Further, it will be understood by a person having ordinary skill in the art that similar user profiles for each of the users may be stored in the memory 204 for other types of workloads, as well.

At step 306, the portion of computational resources from the set of computational resources is determined. In an embodiment, the processor 202 may determine a percentage value based on the user-profile and the set of computational resources. The determined percentage value may be used for determining the portion of the computational resources. In an embodiment, the percentage value can be determined by below provided equation:

$$v_i = 100 * \min\left(1, \max_j\left(\frac{p_{ij}}{P_j}\right)\right) \quad (1)$$

where, $v_i$=percentage value to be determined for user-1, $p_{ij}$=typical value of user-1's requirement (for parameter j) as per the user-profile, $P_j$=maximum value of the corresponding user requirement (i.e., for the parameter j), as per the set of computational resources.

In an embodiment, a first user (e.g., user-1 from the Table 1) wants recommendation for computational resources for hosting web sites. In such a scenario, if:

25000=typical performance requirement of the user-1 (as depicted in Table 1),

200000=maximum value of the performance supported by the set of computational resources in the datacenter 104, 1000=typical load requirement for the user-1 (as depicted in Table 1), and 100000=maximum value of the load supported by the set of computational resources in the datacenter 104, then the percentage value for the user-1 will be determined as:

$$v_1 = 100 * \min\left(1, \max\left(\frac{1000}{100000}, \frac{25000}{200000}\right)\right)$$

i.e., $v_1 = 12.5\%$

In the above example, the parameters (i.e., the performance and the load) are independent to each other, i.e., the value of one parameter doesn't vary while varying other parameter. Similarly, in conjunction with Table 1 and considering the same maximum values of the parameters in the datacenter 104, the corresponding value for the user-2 will be determined as:

$$v_2 = 100 * \min\left(1, \max\left(\frac{10000}{100000}, \frac{12500}{200000}\right)\right)$$

i.e., $v_2 = 10\%$

Thus, with reference to the determined percentage values, it will be apparent to a person having ordinary skills in the art that portion of the computational resources corresponding to the user-1 (i.e., 12.5%) is more than the portion corresponding to the user-2. This implies that for the user-1, the recommendation of the computational resources will be made from 12.5% of the set of computational resources available with the datacenter 104, whereas for the user-2 recommendation will be made from 10% of the set of computational resources available with the datacenter 104.

In an alternate embodiment, different parameters corresponding to the user's requirement may be dependent on each other. For example, the performance parameter may be dependent on the load parameter. In such a scenario, the percentage value may be determined by below provided equation:

$$v_i = 100 * \min\left(1, \prod_j \left(\frac{p_{ij}}{P_j}\right)\right) \quad (2)$$

where, $P_j$ is the maximum dependent value of the user-1's corresponding requirement (for the parameter j), as per the set of computational resources.

For example, if:

25000=typical performance requirement of the user-1 (as depicted in Table 1),

100000=maximum dependent value of the performance supported by the set of computational resources in the datacenter 104, 1000=typical load requirement for the user-1 (as depicted in Table 1), and 100000=maximum value of the load supported by the set of computational resources in the datacenter 104, then the percentage value for the user-1 will be determined as:

$$v_1 = 100 * \min\left(1, \prod\left(\frac{1000}{100000}, \frac{25000}{100000}\right)\right)$$

i.e., $v_1 = 0.25\%$

Similarly, for the user-2, if:

12500=typical performance requirement of the user-2 (as depicted in Table 1),

50000=maximum dependent value of the performance supported by the set of computational resources in the datacenter 104, 10000=typical load requirement for the user-2 (as depicted in Table 1), and 100000=maximum value of the load supported by the set of computational resources in the datacenter 104, then the percentage value for the user-2 will be determined as:

$$v_2 = 100 * \min\left(1, \prod\left(\frac{10000}{100000}, \frac{12500}{50000}\right)\right)$$

i.e. $v_2 = 2.5\%$

In an embodiment, the determined percentage values may be applied to all types of the resources associated with the datacenter 104. For example, if the datacenter 104 includes 200 low-end servers and 400 high-end servers, and if the determined percentage value for a user is 12.5% (e.g., as determined above for the user-1 in conjunction with the equation (1)), then the portion of computational resources for the user-1 will include 25 low-end servers and 50 high-end servers. Subsequently, the user may be recommended computational resources (e.g., in the form of virtual machines), in response to the requests, from this determined portion of computational resources.

Further, in a different example, a user wants recommendation from a datacenter 104 that has available capacity (i.e., the set of computational resources) of 20 CPUs, 80 GB RAM, and 1600 GB disk-space. Thus, if the percentage value determined for a user is 10% (e.g., as determined above for the user-2 in conjunction with the equation (1)), then the portion of the computational resources for the user will include 2 CPUs, 8 GB RAM, and 160 GB disk-space. Thus, for any subsequent request for the recommendation of the computational resources made by the user, the computational resources will be recommended from the determined portion. Further, it will be understood by a person having ordinary skill in the art that different configurations of the virtual machines 112 may be recommended to the user from the portion of the computational resources, in accordance with different requests made by the user.

At step 308, the one or more computational resources are recommended from the determined portion of the computational resources. The processor 202 recommends the one or more computational resources, in response to a request form the user. For example, if the user-1 requests computational resources from the datacenter 104 for executing one or more application/workloads, the processor 202 may determine the recommendations from the portion of the computational resources, as determined in conjunction with step 306 (e.g., 12.5% of the capacity of the datacenter 104), instead of making recommendations from the set of computational resources. It will be apparent to a person skilled in the art that in this way, recommendation made to the users for the computational resources will be more relevant to the actual requirements of the user.

As an example, a user wants recommendation from a datacenter 104 and maximum performance value supported by the datacenter 104 is 30000 responses/min (e.g., in a web-based application). Further, typical performance requirement of the user is 2500 response/min. In such a scenario, if the user gets recommendation from the set of computational resources, i.e., complete available resources, then the recommendation of performance values as high as 30000 response/min may not be useful to the user and may lead to over-provisioning from the user's end. Whereas, if the determined percentage value for the user is 10% (e.g., in conjunction with the step 306), the user will get recommendation from the portion of the datacenter 104 that provides the performance of 3000 response/min and thus the recommendations will be near to the actual performance requirements of the user.

In an embodiment, if a user-profile is not available (e.g., when the user doesn't provide any input regarding the requirement during sign-up), the processor 202 may recommend the computational resources from a fixed percentage of the set of computational resources (say, 10%) that may be calibrated gradually as more requests are transmitted by the user, along with the requirements, and as user-profile is created based on those requests.

Further, it will be apparent to a person skilled in the art that after being recommended with the computational resources, the user may select the one or more recommended computational resources. Consequently, the computational resources may be allocated to the user (e.g., in the form of VMs), based on selection. In an embodiment, the virtual machine servers 110 may allocate the virtual machines 112 to the user. The one or more virtual machines 112 may subsequently be utilized by the user for executing the application/workloads.

At step 310, the user-profile is updated. It will be apparent to a person skilled in the art that as more requests are transmitted by the users, along with associated requirements, the processor 202 may update the typical maximum value of the parameters corresponding to the users.

After step 310, the processor 202 may determine the updated portion of the computational resources, corresponding to the updated user-profile. For example, if based on the user-1's transmitted requests, the processor 202 observes that the typical performance requirement for the user-1 (in conjunction with Table 1) is 20000 page access per minute (instead of 25000 page access per minute), then the processor 202 may determine the percentage values (as per equations (1) and (2)), using the updated value of the performance requirement.

In an embodiment, as multiple users transmit requests for providing recommendations, the set of computational resources available in the datacenter 104 may vary. For example, if a user avails a recommendation provided to her, the total capacity available with the datacenter 104, and thus the set of computational resources associated with the datacenter 104 will be changed. In such a scenario, the processor 202 may prioritize multiple requests from multiple users. For prioritization of the requests, the processor 202 may utilize one or more techniques known in the art, for example, a game-theoretic method, or a first come first serve method. In this way, the processor 202 may determine the portion of computational resources corresponding to each request based on the prioritization.

Figure 4:
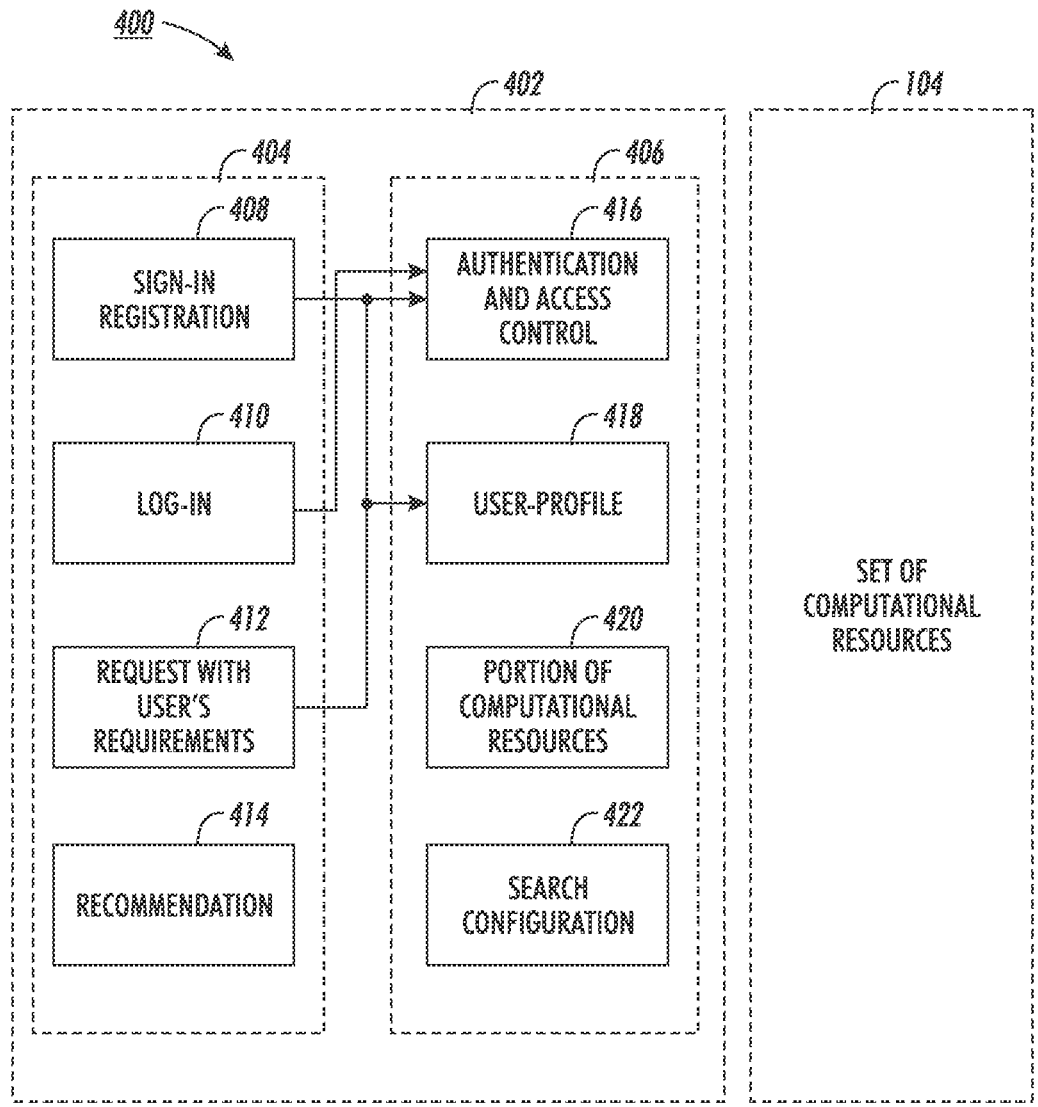
FIG. 4 is a block diagram illustrating implementation of the system for recommending the one or more computational resources to the users, in accordance with at least one embodiment.

FIG. 4 illustrates a block diagram 400, in accordance with at least one embodiment of the present disclosure. The block diagram 400 includes a cloud advisor system 402 and the datacenter 104. The cloud advisor system 402 includes a front-end system 404 and a back-end system 406. The front-end system 404 includes blocks 408-414, and the back-end system 406 includes blocks 416-422, as depicted in FIG. 4.

The cloud advisor system 402 refers to a system that the user accesses for requesting the computational resources for executing the workloads. As disclosed above, the user may login into the cloud advisor system 402 for requesting and deploying the one or more computational resources.

The front-end system 404, as depicted in FIG. 4, illustrates a module for the user interaction. In an embodiment, the front-end system 404 may provide a graphical interface to the user. The user may interact with the cloud advisor system 402 using the graphical interface. The different blocks (i.e., 408-414) in the front-end system 404 correspond to different steps that may be executed by the front-end system 404. For example, blocks 408 to 414 correspond to, respectively, user signing in and registering in the cloud advisor system 402, user logging in the cloud advisor system 402 after successful registration, the user transmitting requests with user requirements, and the users receiving recommendation for the computational resources.

The back-end system 406 refers to processes being executed in the cloud advisor system 402 that authenticates and controls access for the user (depicted by the block 416), determines the user-profile (depicted by the block 418), determines the portion of computational resources (depicted by the block 420), and searches for the configuration from the portion of computational resources (depicted by the block 422).

The datacenter 104 refers to the infrastructure associated with the provider and has been described in conjunction with FIG. 1.

In accordance with step 302, the user provides one or more requirements while signing up with the cloud advisor system 402, as depicted by the block 408. In an embodiment, the user may provide the one or more requirements using the graphical interface provided by the front-end system 404. For example, the user may specify inputs corresponding to typical maximum load, performance, or cost. In an embodiment, the user's requirements may also be collected from the transmitted requests, as disclosed in conjunction with FIG. 3.

In accordance with step 304, the user-profile is generated (depicted by the block 418). The back-end system 406 may generate the user-profile based on the inputs provided by the user. Further, as disclosed previously, the cloud provider system 402 may store the user-profile in the memory 204 (not shown in FIG. 4).

In accordance with step 306, the portion of computational resources is determined. The back-end system 406 may determine the portion, based on the generated user-profile and the datacenter 104's capacity (depicted by the block 420). The determination of the portion has been discussed in conjunction with FIG. 3.

In accordance with step 308, recommendation of the one or more computational resources is made. The back-end system 406 may search for the best configuration of the computational resources by one or more techniques known in the art, and may recommend the configuration to the user (as depicted by the block 414).

In accordance with step 310, the back-end system 406 may update the user-profile as more requests are transmitted by the user.

The disclosed embodiments encompass numerous advantages. Generally, the users are provided recommendations of the computational resources, in response to the requests from the users, either from complete set of computational resources available with the provider or from a static percentage of the complete set of computational resource. For example, a provider may consider 20% of the complete set of computational resources available with her to provide recommendations to the user. However, in such a scenario, the recommendations provided to the users may not be correct and may lead to incorrect provisioning (either over-provisioning or under-provisioning) of the resources. For example, for a provider with very large datacenter, recommendations from a fixed percentage of 20% of available computational resources may be higher than the configuration that is actually required by the user, whereas for a provider with small datacenter, same percentage of 20% may lead to recommendation that are not sufficient to cater the user's requirements.

In addition, providing recommendations from the complete set of available resources may have recommendations with reduced granularity, thus leading to incorrect selection of the configuration by the users, or it might be possible that users don't get recommended with the actual requirements. For example, if the minimum and maximum performance values associated with a datacenter are 2000 and 25000 response/min, respectively, and the user does not need the performance values as high as 25000 response/min, then making recommendations from this range may lead to over-provisioning from user's side.

Further, users' requirement may also vary significantly based on the workloads the users want to deploy on the computational resources. For example, a user willing to deploy web services may have different requirements of computational resources than a user willing to deploy big data applications. Similarly, an SMB customer may need small-scale deployment and a big enterprise may need large-scale deployment. Thus, intuitively both the customers (i.e., the SMB and big enterprise) should be provided recommendations from different capacities of the computational resources.

Thus, by providing a method to determine the portion of the computational resources associated with a provider considering both, the user's requirements and capacity of the provider, the recommendation made to the users will be more relevant.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for recommending computational resources have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for recommending one or more computational resources to one or more users, the method comprising:
    determining, by one or more processors, a portion of computational resources from a set of computational resources associated with a datacenter based on a user-profile associated with each user from the one or more users, and the set of computational resources, wherein the user-profile comprises at least one of a required performance level, a required load, or a cost constraint; and
    recommending, by the one or more processors, the one or more computational resources from the portion of computational resources, in response to request received from the one or more users, wherein the one or more users with different user-profiles get the recommendations from different portions of computational resources in the datacenter.

2. The method of claim 1, wherein the one or more computational resources correspond to at least one of one or more servers in the datacenter, CPUs, memory, or disk-space.

3. The method of claim 1 further comprising obtaining, by the one or more processors, at least one of the required performance level, the required load, or the cost constraint, based on at least one of an input provided by the one or more users during sign-up or a historical data pertaining to tasks sent by the one or more users for execution.

4. The method of claim 3 further comprising updating, by the one or more processors, the historical data based on the tasks sent by the one or more users.

5. The method of claim 4 further comprising updating, by the one or more processors, the user-profile based on the updated historical data.

6. The method of claim 5 further comprising updating, by the one or more processors, the portion of computational resources based on the updated user-profile.

7. The method of claim 1 further comprising prioritizing, by the one or more processors, a plurality of the requests from the one or more users.

8. The method of claim 7, wherein the plurality of the requests from the one or more users are prioritized based on at least one of a game-theoretic method or a first come first serve method.

9. The method of claim 7 further comprising determining, by the one or more processors, the portion of computational resources for each of the plurality of the requests based on the prioritization.

10. A system for recommending one or more computational resources to one or more users, the system comprising:
one or more processors operable to:
determine a portion of computational resources from a set of computational resources associated with a datacenter based on a user-profile associated with each user from the one or more users, and the set of computational resources, wherein the user-profile comprises at least one of a required performance level, a required load, or a cost constraint; and
recommend the one or more computational resources from the portion of computational resources, in response to request received from the one or more users, wherein the one or more users with different user-profiles get the recommendations from different portions of computational resources in the datacenter.

11. The system of claim 10, wherein the one or more computational resources correspond to at least one of one or more servers in the datacenter, CPUs, memory, or disk-space.

12. The system of claim 10, wherein the one or more processors are further operable to obtain at least one of the required performance level, the required load, or the cost constraint, based on at least one of an input provided by the one or more users during sign-up or a historical data pertaining to tasks sent by the one or more users for execution.

13. The system of claim 12, wherein the one or more processors are further operable to update the historical data based on the tasks sent by the one or more users.

14. The system of claim 13, wherein the one or more processors are further operable to update the user-profile based on the updated historical data.

15. The system of claim 14, wherein the one or more processors are further operable to update the portion of computational resources based on the updated user-profile.

16. The system of claim 15, wherein the one or more processors are further operable to prioritize a plurality of the requests from the one or more users.

17. The system of claim 16, wherein the plurality of the requests from the one or more users are prioritized based on at least one of a game-theoretic method or a first come first serve method.

18. The system of claim 17, wherein the one or more processors are further operable to determine the portion of computational resources for each of the plurality of the requests based on the prioritization.

19. A computer program product for use with a computer, the computer program product comprising a non-transitory computer readable medium, wherein the non-transitory computer readable medium stores a computer program code for recommending one or more computational resources to one or more users, wherein the computer program code is executable by one or more processors to:
determine a portion of computational resources from a set of computational resources associated with a datacenter based on a user-profile associated with each user from the one or more users, and the set of computational resources, wherein the user-profile comprises at least one of a required performance level, a required load, or a cost constraint; and
recommend the one or more computational resources from the portion of computational resources, in response to request received from the one or more users, wherein the one or more users with different user-profiles get the recommendations from different portions of computational resources in the datacenter.

* * * * *